Dec. 4, 1923.

C. L. C. MAGEE 1,476,367

FRICTION BRAKE MECHANISM

Filed Oct. 2, 1920

Inventor:
Chauncey L. C. Magee
By Arthur F. Durand
Attorney

Patented Dec. 4, 1923.

1,476,367

UNITED STATES PATENT OFFICE.

CHAUNCEY L. C. MAGEE, OF CHICAGO, ILLINOIS.

FRICTION BRAKE MECHANISM.

Application filed October 2, 1920. Serial No. 414,285.

*To all whom it may concern:*

Be it known that I, CHAUNCEY L. C. MAGEE, a citizen of the United States, of the city of Chicago, in the county of Cook, in the State of Illinois, have invented a certain new and useful Improvement in Friction Brake Mechanism, of which the following is a specification.

This invention relates to friction band brakes for motor vehicles, such as automobiles, trucks and tractors.

Generally stated, the object of the invention is to provide an improved construction and arrangement which will ensure a more satisfactory and reliable operation than heretofore, in the use of a brake of this kind, and whereby the brake will not only wear more evenly, but may also be depended on to stop the vehicle when operated for that purpose.

To these and other useful ends, the invention consists in matters hereinafter set forth and claimed, and shown in the accompanying drawings, in which:

Figure 1:
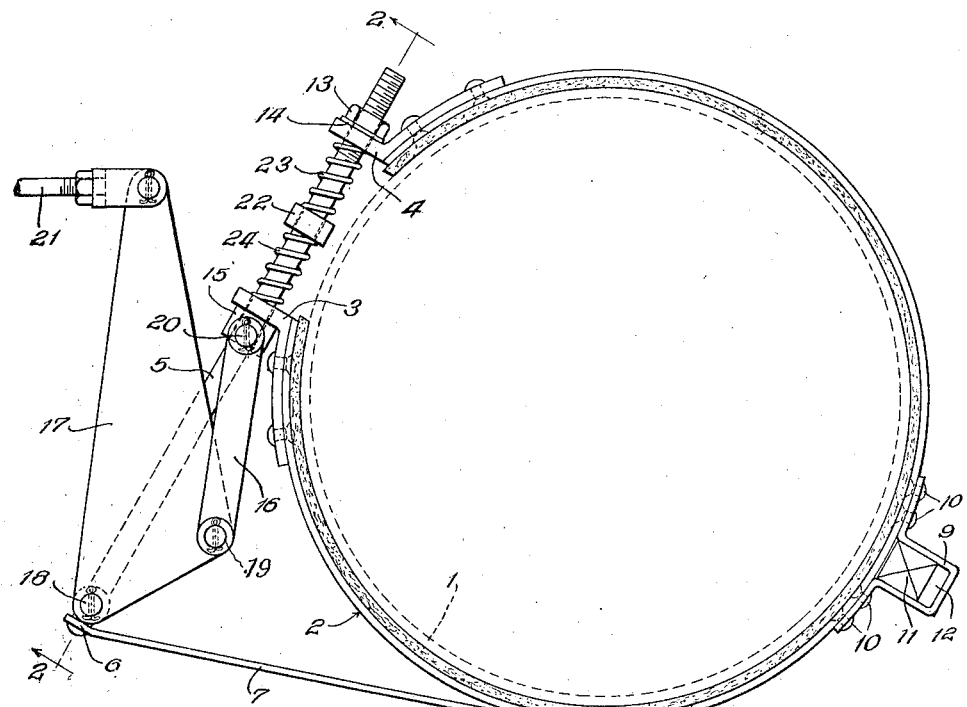
Figure 1 is a side elevation of a friction band brake mechanism embodying the principles of the invention.
Figure 2:
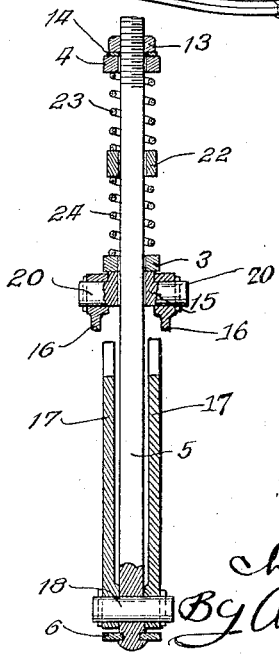
Figure 2 is an enlarged detail sectional view.

As thus illustrated, the invention comprises a drum 1 of any suitable character secured to the wheel (not shown) of the motor vehicle, it being understood that the friction brake herein shown and described may be employed wherever required, and in connection with any kind of machine or apparatus. As herein shown and described, however, it is more particularly adapted for use on motor vehicles.

The brake band 2 may be of any suitable known or approved character, and has its end portions provided with brackets 3 and 4 of any suitable character. The rod 5 extends through said brackets to form a tie extending directly across the gap between the ends of the band, and the lower end of the rod is secured at 6 to the spring band or other similar member 7 which is in turn secured by rivets 8 to the side of the band itself, whereby the operating mechanism, as hereafter will more fully appear, is practically supported entirely by the band. At a point diametrically opposite said gap in the band, a U-shaped bracket 9 is secured by rivets 10 to the band to engage a stationary support 11 carried by any suitable portion of the body frame of the vehicle. With the clearance 12 provided in said bracket 9, between its end portion and support 11, it will be seen that the said bracket 9 can slide radially on said support, thus allowing the band to grip the drum in the desired manner, and to be released therefrom. A nut 13 is screwed upon the threaded upper end portion of the rod 5, and a lock washer 14 is interposed between said nut and the bracket 4, whereby said rod has a pulling engagement with this end of the band. A collar 15 is mounted on the rod 5, below the bracket 3, which latter has a sliding engagement with said rod, and said collar is pivotally connected with the upper end of a link 16 which extends downwardly therefrom. Said collar 15 is not rigidly connected to the bracket 3, as shown, for this is not necessary, inasmuch as the link 16 is required to push upwardly on this bracket, and never exerts a pull thereon, whereby said link has a pushing engagement or connection with this end of the band. A triangular lever 17 is pivoted at 18 on the lower portion of the rod 5 and has its pivotal point 19 connected to the lower end of the link 16, whereby the three pivotal points 18, 19 and 20 form a toggle connection which, when the pivotal point 19 is moved toward the rod 5, tends to straighten out (the three points 18, 19, and 20 are more nearly in alinement) and exert a push upward on the bracket 3, at the same time exerting a downward pull on the rod 5, thus contracting the gap in the band 2 and causing it to contract on the drum. In other words, the pivot 19 is in the nature of a knuckle joint which operates by the extension or straightening movement thereof to force the joints 18 and 20 further apart and to thus contract or tighten the band on the drum. A rod 21 can be connected to the upper end of the lever 17 to control the mechanism which operates the friction brake thus constructed, thereby to control the action of the brake band on the drum.

Thus constructed, it will be seen that the operating mechanism forms with the band a self-contained structural unit, the mechanism being practically supported entirely by the band itself, so that the band and its operating mechanism can be taken off intact, by removing the nut 13, by disengaging the bracket from the support 11, in a manner that will be readily understood. However, it is desirable, in a friction brake of this character, to provide a guide 22 for the rod 5, and better results are insured, for some purposes, when this guide is disposed about midway between the two brackets 3 and 4, as shown. Any suitable arrangement can be employed for supporting said guide 22 in position. With this arrangement a compression spring 23 is interposed between the guide 22 and the bracket 4, and a similar spring 24 is interposed between the guide 22 and the bracket 3, both springs being carried by said rod. With this arrangement, as will be readily understood, the band is automatically expanded to release it from the drum, as the two springs 23 and 24 serve to push the brackets 3 and 4 away from each other, when the pull on the rod 21 is discontinued, thereby allowing the band to release its grip on the drum. With this arrangement, furthermore, the guide 22 and the support 11, being diametrically opposite, the wear on the band is more evenly distributed about the circumference thereof, thus ensuring better results and a longer life for the band, the latter being lined with any suitable material which will best serve the purpose.

Furthermore, the brake thus constructed is not liable to rattle, is held firmly in a manner to prevent the band from vibrating or having intermittent gripping action on the drum. Heretofore, some friction brakes have been so constructed that the torque of the drum tended to strain the operating mechanism, and to open the gap in the band, thereby releasing the latter, this action occurring intermittently after the setting of the brake band on the drum. In the construction shown and described, however, the rod 5 forms a tie directly across the gap between the ends of the band of a very positive character, so that the torque of the drum does not tend to open or widen the gap after the band is once contracted thereon, the toggle mechanism (it is important that the toggle or knuckle joint is not in the gap, and that its power is exerted by extension or straightening thereof) serving as a positive lock to maintain the two ends of the band a fixed distance apart after being once adjusted to the position necessary to exert the desired pressure or friction on the drum. Heretofore, with friction brake devices of this general character the two ends of the band were so connected together that the connection was liable to give or yield under the strain of the torque of the drum, especially so if the automobile or other machine having the drum was moving at high speed when the brake was applied; but with the construction shown and described, involving a direct and positive connection forming a tie which is always straight between the two ends of the band, rotation of the drum in either direction can be effectively stopped without danger of straining the connection between the two ends of the band and without vibration or any bumping or intermittent action of the band on the drum.

The member 7 is preferably flexible and resilient in character, so that the rod 5 may move downward with the bracket 14 to about the same extent that the link 16 and the bracket 3 move upward. If the support formed by the member 7 were rigid, the pivotal point 18 would be absolutely stationary, and the rod 5 would not move endwise at all, and the entire action would be confined to an upward movement of the bracket 3 to contract the gap in the band for the purpose of setting the latter on the drum; but with the member 7 made flexible, it will be seen that the brackets 3 and 4 can move towards each other, thus balancing the action and equaling the pressure of the band around the circumference of the drum.

It will be seen that the flexible member 7 has a compression strain imposed thereon when the mechanism is operated to contract the band on the drum. It will be understood, however, that the invention is not limited to the exact construction shown and described, and while the rod 5 is shown as being perfectly straight, it may, of course, have any other desired shape or form, and the mechanism may be so arranged that the strain imposed on said flexible member 7 will be of any suitable, desired or necessary character, depending on circumstances and the character of the vehicle or other machine upon which the brake is employed.

Preferably the lever 17 and link 16 are double, or duplicated at opposite sides, to balance the action, in a manner that will be readily understood.

While the invention is shown as being applied to or used in a brake, it will be understood that it can be used in any device in which a friction band may be employed to advantage to grip a rotary drum, for any suitable or desired purpose.

What I claim as my invention is:

1. In combination with a motor vehicle wheel, a friction brake therefor comprising a drum which turns with the wheel, a brake band on said drum, and toggle mechanism the knuckle joint of which is operative by the straightening motion thereof and by the consequent longitudinal extension of the toggle for contracting the band on the drum, comprising a guide engaging said mechanism and in which a portion of the mechanism slides endwise and except for which the entire toggle mechanism is supported by the band itself.

2. In combination with a motor vehicle wheel, a friction brake therefor comprising a drum which turns with the wheel, a brake band on said drum, and toggle mechanism the knuckle joint of which is operative by the straightening motion thereof and by the consequent longitudinal extension of the toggle for contracting the band on the drum, said mechanism comprising a rod connected to pull on one end of the band, a link connected to push on the other end of said band, spring means on said rod to expand the band, a member secured to the band to form a support for said rod, a lever pivoted on said rod, a pivot to connect said link and lever together, thus forming the toggle, a guide for said rod, and a bracket for each end of the band, said rod extending through each bracket, and said link being pivoted on one bracket which slides on the rod.

3. In combination with a motor vehicle wheel, a friction brake therefor comprising a drum which turns with the wheel, a brake band on said drum, and toggle mechanism the knuckle joint of which is operative by the straightening motion thereof and by the consequent longitudinal extension of the toggle for contracting the band on the drum, comprising a support for the band, and a spring secured to said band to form a resilient support for said toggle mechanism.

4. In a friction brake, the combination of a brake band, mechanism for contracting the band, means to operatively connect the ends of the band to said mechanism, a member secured to the band and movable relatively to the joint of attachment thereon to provide a fulcrum for said mechanism, and means connected to said mechanism to control the brake.

5. A structure as specified in claim 4, said member being a spring.

6. In a friction brake, the combination of a brake band, operating mechanism comprising a rod forming a straight tie directly across the gap between the ends of the band, both ends having rigid means to engage the rod, and means connected to said mechanism to pull on one end of said rod to control the brake, comprising a member secured to said band to support the end of said rod.

7. A friction brake comprising a brake band, mechanism for contracting the band, a member secured to the band to support said mechanism, and means for operating said mechanism, said member sustaining an endwise compression strain when said mechanism is operated to contract the band.

8. In a friction device, the combination of a friction band, operating mechanism comprising a rod forming a straight tie directly across the gap between the ends of the band, both ends having rigid means to engage the rod, and means connected to said mechanism to pull on said rod to control the brake, said mechanism comprising a pivot member slidable on the rod, connected to one end of the band, a pivot fixed on the rod, and a toggle joint between said pivots, operable by said controlling means.

9. A structure as specified in claim 8, in combination with a guide for said rod between the ends of the band, a movable support for said rod, and compression springs interposed between said guide and the ends of the band.

10. A structure as specified in claim 8, and means to support the rod on the band, said rod having a sliding engagement with one end of the band and a pulling engagement with the other end.

11. A friction brake comprising a brake band and operating mechanism therefor, including a toggle the knuckle of which is operative by straightening motion thereof to contract the band, all forming a self contained structural unit including a guide rigid with the band and a rod sliding in said guide and supported by the band itself, in combination with a stationary guide for an endwise movable part of said mechanism, and a support for the band.

CHAUNCEY L. C. MAGEE.